J. E SIMMONS.
VEHICLE SPRING.
APPLICATION FILED JUNE 17, 1920.

1,379,223.

Patented May 24, 1921.

INVENTOR.
John E. Simmons
BY
C. F. Blake
ATTORNEY.

UNITED STATES PATENT OFFICE.

JOHN E. SIMMONS, OF PORTLAND, OREGON.

VEHICLE-SPRING.

1,379,223.  Specification of Letters Patent.  Patented May 24, 1921.

Application filed June 17, 1920. Serial No. 389,789.

*To all whom it may concern:*

Be it known that I, JOHN E. SIMMONS, a citizen of the United States, residing at Portland, county of Multnomah, State of Oregon, have invented certain new and useful Improvements in Vehicle-Springs, of which the following is a specification.

My invention relates to vehicle springs in general, and particularly to such springs as are used upon automobiles supplementary to the main body springs, and are known as shock absorbers.

Figure 1:
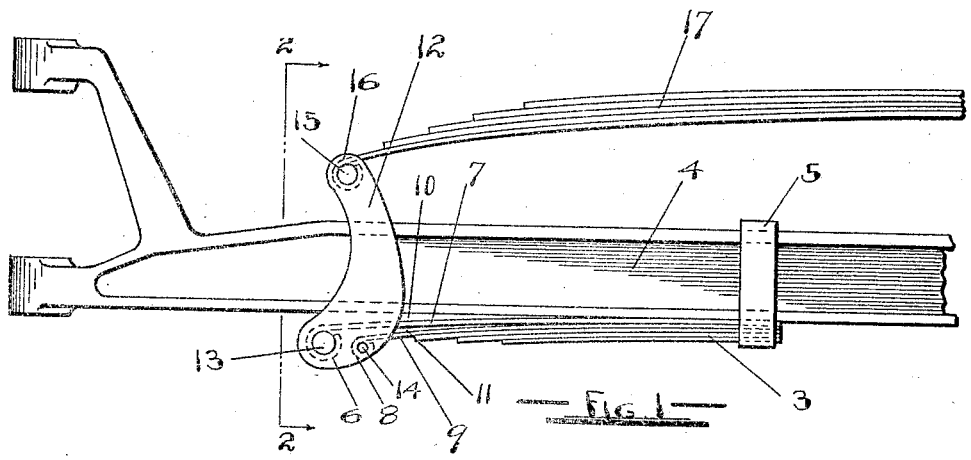
Figure 2:
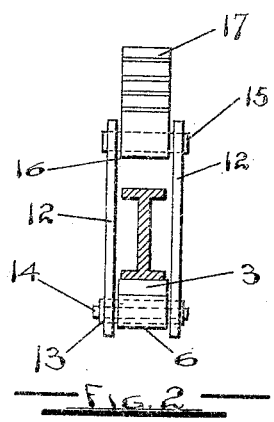

The object of my invention is to provide such a device as may be easily and simply applied to the automobile, that will augment the action of the main spring, prevent side sway and act to prevent rebound. I accomplish this object by means of the construction illustrated in the accompanying drawing, which is a part of this application for Letters Patent, like characters of reference indicating like parts throughout the several views thereof, and in which:

Figure 1 is an elevation of an automobile axle and spring with my device attached thereto, and Fig. 2 is a sectional elevation upon line 2—2 of Fig. 1.

I provide a laminated leaf spring 3 to be secured to the axle 4 by a suitable clip 5, and to extend from said clip toward the outer end of the axle. An eye 6 is provided upon the outer end of the upper and longest leaf 7 of the spring 3, and an eye 8 is also provided upon the outer end of the adjacent leaf 9. The spring 3 is so formed that a space 10 is provided between the outer end of the leaf 7 and the axle 4, and a space is also provided between the outer ends of the adjacent leaves 7 and 9, as shown in Fig. 1, at 11.

Shackle arms 12 are provided, one upon each side of the axle 4 and adapted to receive pins 13 and 14 passing through eyes 6 and 8 respectively of the spring 3. The upper ends of the shackle arms 12, above the axle 4, are adapted to receive the pin 15 passing through the eye 16 in the end of the main spring 17.

It is obvious from this construction that any downward vertical movement of the spring 17 will be communicated to the spring 3; it is also obvious that the deflection of spring 17 will cause the upper ends of the shackle arms 12 to move slightly outward toward the end of the axle 4 and thus cause the leaves 7 and 9 of the spring 3 to be drawn toward one another; it is further obvious that any rebound of the main spring 17 will cause the upper ends of the shackle arms 12 to move slightly inward toward the center of the axle 4 and thus cause the leaves 7 and 9 of the spring 3 to withdraw one from the other; and finally it is obvious that any side sway of the main spring 17 will cause similar movement of the upper ends of the shackle arms 12 and will be resisted by the action of the leaves 7 and 9 of the spring 3.

My device, therefore, presents spring resistance to all movements of the vehicle body, either downward under load, upward under rebound or sidewise, and thus provides a remarkably easy riding vehicle spring device.

My device may be made of any size, and constructed of any materials deemed convenient and suitable for a device of this character, and while I have illustrated and described a form of construction and arrangement of parts found desirable in materializing my invention, I wish to include in this application all mechanical equivalents or substitutes that may fairly be considered to come within the scope and purview of my invention as defined in the appended claims.

Having disclosed my invention so that others may be enabled to construct and to use the same, what I claim as new, and desire to secure by Letters Patent is:

1. A pair of laminated flat leaf springs disposed upon opposite sides of a vehicle axle; and shackle arms connecting said springs, one of said springs being pivotally connected to said shackle arms at a single point thereon, and the other of said springs being pivotally connected to said shackle arms at two points thereon.

2. A laminated leaf spring adapted to be secured beneath a vehicle axle; an eye formed upon the outer end of the longest leaf of said spring; an eye formed upon the outer end of the second longest leaf of said spring; a shackle arm pivotally connected to each of said eyes and extending above said axle; and a laminated leaf spring pivotally connected to the upper end of said shackle arm.

3. A vehicle axle; a laminated auxiliary spring secured beneath said axle; a laminated main spring above said axle; and a shackle arm pivotally secured to said main spring at one point thereon, and pivotally secured to said auxiliary spring at two points thereon, said two points being relatively movable.

4. A vehicle axle; a main leaf spring of laminated construction above said axle; an auxiliary leaf spring of laminated construction secured to said axle beneath the same; and a shackle arm pivotally attached at one point to said main spring and pivotally attached at two relatively movable points upon said auxiliary spring.

In witness whereof I claim the foregoing as my own I hereunto affix my signature at Portland, county of Multnomah, State of Oregon, this 12th day of June, 1920.

JOHN E. SIMMONS.

Witnesses:
L. J. ROBINSON,
C. F. BLAKE.